US012771911B2

(12) United States Patent
Doucleff et al.

(10) Patent No.: US 12,771,911 B2
(45) Date of Patent: Oct. 20, 2026

(54) METHODS, SYSTEMS, AND MEDIA FOR STREAMING VIDEO CONTENT USING ADAPTIVE BUFFERS

(71) Applicant: Google LLC, Mountain View, CA (US)

(72) Inventors: Matt Doucleff, San Francisco, CA (US); Anil Vijendran, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/746,014

(22) Filed: Jun. 17, 2024

(65) Prior Publication Data

US 2024/0340507 A1 Oct. 10, 2024

Related U.S. Application Data

(63) Continuation of application No. 18/090,897, filed on Dec. 29, 2022, now Pat. No. 12,015,834, which is a continuation of application No. 17/070,144, filed on Oct. 14, 2020, now Pat. No. 11,546,675.

(60) Provisional application No. 62/914,978, filed on Oct. 14, 2019.

(51) Int. Cl.

| | |
|---|---|
| ***H04N 21/845*** | (2011.01) |
| ***H04N 21/2343*** | (2011.01) |
| ***H04N 21/44*** | (2011.01) |

(52) U.S. Cl.
CPC ... *H04N 21/8456* (2013.01); *H04N 21/23439* (2013.01); *H04N 21/44004* (2013.01)

(58) Field of Classification Search
None
See application file for complete search history.

(56) References Cited

U.S. PATENT DOCUMENTS

| | | | |
|---|---|---|---|
| 9,451,306 | B2 | 9/2016 | Sarukkai et al. |
| 2008/0310814 | A1 | 12/2008 | Bowra et al. |
| 2013/0174045 | A1 | 7/2013 | Sarukkai et al. |

(Continued)

FOREIGN PATENT DOCUMENTS

| | | | |
|---|---|---|---|
| EP | 4038892 | B1 | 3/2024 |
| GB | 2533942 | A | 7/2016 |

(Continued)

OTHER PUBLICATIONS

Examination Report issued in IN Application No. 202247025914 dated Aug. 31, 2022, 2 pages.

(Continued)

*Primary Examiner* — Scott B Christensen
(74) *Attorney, Agent, or Firm* — Lowenstein Sandler LLP

(57) ABSTRACT

Methods, systems, and media for streaming video content using adaptive buffers are provided. In some embodiments, the method comprises: receiving, from a user device to a server, a request to stream a video content item; determining a predicted abandonment distribution that indicates a plurality of likelihoods of a user of the user device stopping presentation of the video content item at a corresponding plurality of presentation time points of the video content item, wherein the predicted abandonment distribution is normalized to a duration of the video content item; and transmitting, to the user device, a portion of the video content item to the user device based on the predicted abandonment distribution.

20 Claims, 4 Drawing Sheets

(56) References Cited

U.S. PATENT DOCUMENTS

| | | | | |
|---|---|---|---|---|
| 2015/0333986 | A1 | 11/2015 | Pang et al. | |
| 2016/0065995 | A1* | 3/2016 | Phillips | H04N 21/25841 725/62 |
| 2016/0248704 | A1 | 8/2016 | Soelberg et al. | |
| 2017/0072321 | A1 | 3/2017 | Thompson et al. | |
| 2017/0311035 | A1* | 10/2017 | Lewis | H04N 21/4826 |
| 2018/0262813 | A1* | 9/2018 | Moorthy | H04N 21/2662 |
| 2019/0261053 | A1 | 8/2019 | Burkart et al. | |
| 2019/0281333 | A1* | 9/2019 | Liu | H04N 21/251 |
| 2019/0306215 | A1* | 10/2019 | Bastide | H04L 65/612 |
| 2020/0099979 | A1* | 3/2020 | Panchaksharaiah | H04N 21/4532 |
| 2021/0029190 | A1 | 1/2021 | Knowler | |
| 2021/0105531 | A1* | 4/2021 | Kawashima | H04N 21/2407 |

FOREIGN PATENT DOCUMENTS

| | | | |
|---|---|---|---|
| JP | 2006345582 | A | 12/2006 |
| JP | 2010258489 | A | 11/2010 |
| JP | 2011146998 | A | 7/2011 |
| JP | 2013098982 | A | 5/2013 |
| WO | 0232083 | A1 | 4/2002 |
| WO | 2019016561 | A1 | 1/2019 |
| WO | 2019059134 | A1 | 3/2019 |

OTHER PUBLICATIONS

Extended European Search Report for European Application No. 24161535.0, mailed Apr. 26, 2024, 10 Pages.

International Search Report and Written Opinion for International Application No. PCT/US2020/015000, mailed Apr. 7, 2020, 15 Pages.

Office Action for Chinese Patent Application No. 202080071492.7, mailed Mar. 30, 2024, 15 Pages.

Office Action for Japanese Patent Application No. 2022-522357, mailed Jun. 19, 2023, 5 Pages.

Office Action for Korean Patent Application No. 10-2022-7016144, mailed Feb. 8, 2024, 11 Pages.

Notice of Allowance for Japanese Patent Application No. 2023117721, mailed Aug. 19, 2024, 03 pages.

Office Action of European Patent Application No. 24161535.0, mailed Apr. 1, 2025, 07 Pages.

* cited by examiner

METHODS, SYSTEMS, AND MEDIA FOR STREAMING VIDEO CONTENT USING ADAPTIVE BUFFERS

CROSS-REFERENCE TO RELATED APPLICATIONS

This application is a continuation of co-pending U.S. patent application Ser. No. 18/090,897, filed Dec. 29, 2022, which is a continuation of U.S. application Ser. No. 17/070,144, filed Oct. 14, 2020, now U.S. Pat. No. 11,546,675, which claims the benefit of U.S. Patent Application No. 62/914,978, filed Oct. 14, 2019, each of which is incorporated herein by reference.

TECHNICAL FIELD

The disclosed subject matter relates to methods, systems, and media for streaming video content using adaptive buffers.

BACKGROUND

Users frequently stream media content (e.g., videos, television programs, movies, music, etc.) from media content sharing services to user devices (e.g., mobile phones, tablet computers, smart televisions, media players, etc.). A user device streaming a media content item may buffer the media content item so that a portion of the media content is available for presentation in cases where a network connection used to stream the media content item drops in quality or lags. In many cases, a user device uses a fixed buffer size. In some such cases, a server may transmit portions of a media content item that are stored in the buffer that are not presented, for example, in cases where a user of the user device stops presentation of the media content item before the stored portions are presented. Transmitting portions of a media content item that are buffered but not presented can be a waste of resources, both for the server and the user device.

Accordingly, it is desirable to provide new methods, systems, and media for streaming video content.

SUMMARY

Methods, systems, and media for streaming video content using adaptive buffers are provided. (An "adaptive" buffer provides memory storage having a size (e.g., storage capacity) that may be changed as required, whereas a fixed buffer provides memory storage of a fixed size.)

In accordance with some embodiments of the disclosed subject matter, a method for streaming video content using buffers is provided, the method comprising: transmitting, from a user device to a server, a request to stream a video content item; receiving, at the user device from the server, a predicted abandonment distribution that indicates a plurality of likelihoods of a user of the user device stopping presentation of the video content item at a corresponding plurality of presentation time points of the video content item; receiving, at the user device from the server, a first portion of the video content item; storing the first portion of the video content item in a buffer of the user device having a first size; causing the video content item to be presented by the user device; determining a second size of the buffer based on the predicted abandonment distribution; modifying a size of the buffer to the second size; requesting a second portion of the video content item from the server based on the second size of the buffer; receiving the second portion of the video content item from the server; and storing the second portion of the video content item in the buffer of the second size while continuing presentation of the video content item. Typically the presentation time points for which the predicted abandonment distribution indicates a respective likelihood of the user of the user device stopping presentation of the video content item include at least one time point that is between the start time point of the content item and the end time point of the content item, and may include multiple different time points that are between the start time point of the content item and the end time point. Additionally, the presentation time points for which the predicted abandonment distribution indicates a respective likelihood of the user of the user device stopping presentation of the video content item may include the end point of the video content item. As a further example, the presentation time points for which the predicted abandonment distribution indicates a respective likelihood of the user of the user device stopping presentation of the video content item may be at point D/n, 2D/n . . . (n−1)D/n, where n is a positive integer and D is the duration of the video content item, and optionally may also include a presentation time point at the end of the video content item.

In some embodiments, determining the second size of the buffer based on the predicted abandonment distribution comprises: determining that a likelihood of the plurality of likelihoods of the user of the user device stopping presentation of the video content item is below a predetermined threshold; and, in response to determining that the likelihood of the plurality of likelihoods is below the predetermined threshold, determining that the second size of the buffer is to be larger than the first size.

In some embodiments, determining the second size of the buffer based on the predicted abandonment distribution comprises: determining that a likelihood of the plurality of likelihoods of the user of the user device stopping presentation of the video content item exceeds a predetermined threshold; and, in response to determining that the likelihood of the plurality of likelihoods exceeds the predetermined threshold, determining that the second size of the buffer is to be smaller than the first size.

In some embodiments, the method further comprises: determining a third size of the buffer based on the predicted abandonment distribution; and modifying the size of the buffer to the third size while continuing presentation of the video content item.

In some embodiments, the predicted abandonment distribution is normalized to a duration of the video content item.

In some embodiments, the predicted abandonment distribution is calculated based on a duration of the video content item.

In some embodiments, the predicted abandonment distribution is calculated based on characteristics of the video content item.

In accordance with some embodiments of the disclosed subject matter, a system for streaming video content using buffers is provided, the system comprising a hardware processor that is configured to: transmit, from a user device to a server, a request to stream a video content item; receive, at the user device from the server, a predicted abandonment distribution that indicates a plurality of likelihoods of a user of the user device stopping presentation of the video content item at a corresponding plurality of presentation time points of the video content item; receive, at the user device from the server, a first portion of the video content item; store the first portion of the video content item in a buffer of the user device having a first size; cause the video content item to be presented by the user device; determine a second size of the buffer based on the predicted abandonment distribution; modify a size of the buffer to the second size; request a second portion of the video content item from the server based on the second size of the buffer; receive the second portion of the video content item from the server; and store the second portion of the video content item in the buffer of the second size while continuing presentation of the video content item.

In accordance with some embodiments of the disclosed subject matter, there is provided a computer-readable medium, which may be a non-transitory computer-readable medium although these embodiments are not limited to a non-transitory computer-readable medium. In some embodiments, the computer-readable medium contains computer executable instructions that, when executed by a processor, cause the processor to perform a method for streaming video content using buffers, the method comprising: transmitting, from a user device to a server, a request to stream a video content item; receiving, at the user device from the server, a predicted abandonment distribution that indicates a plurality of likelihoods of a user of the user device stopping presentation of the video content item at a corresponding plurality of presentation time points of the video content item; receiving, at the user device from the server, a first portion of the video content item; storing the first portion of the video content item in a buffer of the user device having a first size; causing the video content item to be presented by the user device; determining a second size of the buffer based on the predicted abandonment distribution; modifying a size of the buffer to the second size; requesting a second portion of the video content item from the server based on the second size of the buffer; receiving the second portion of the video content item from the server; and storing the second portion of the video content item in the buffer of the second size while continuing presentation of the video content item. In accordance with other embodiments of the disclosed subject matter, there is provided a computer-readable medium, which may be a non-transitory computer-readable medium although these embodiments are not limited to a non-transitory computer-readable medium, containing computer executable instructions that, when executed by a processor, cause the processor to perform a method according to any embodiment or implementation as described herein.

In accordance with some embodiments of the disclosed subject matter, a system for streaming video content using buffers is provided, the system comprising: means for transmitting, from a user device to a server, a request to stream a video content item; means for receiving, at the user device from the server, a predicted abandonment distribution that indicates a plurality of likelihoods of a user of the user device stopping presentation of the video content item at a corresponding plurality of presentation time points of the video content item; means for receiving, at the user device from the server, a first portion of the video content item; means for storing the first portion of the video content item in a buffer of the user device having a first size; causing the video content item to be presented by the user device; means for determining a second size of the buffer based on the predicted abandonment distribution; means for modifying a size of the buffer to the second size; means for requesting a second portion of the video content item from the server based on the second size of the buffer; means for receiving the second portion of the video content item from the server; and means for storing the second portion of the video content item in the buffer of the second size while continuing presentation of the video content item.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
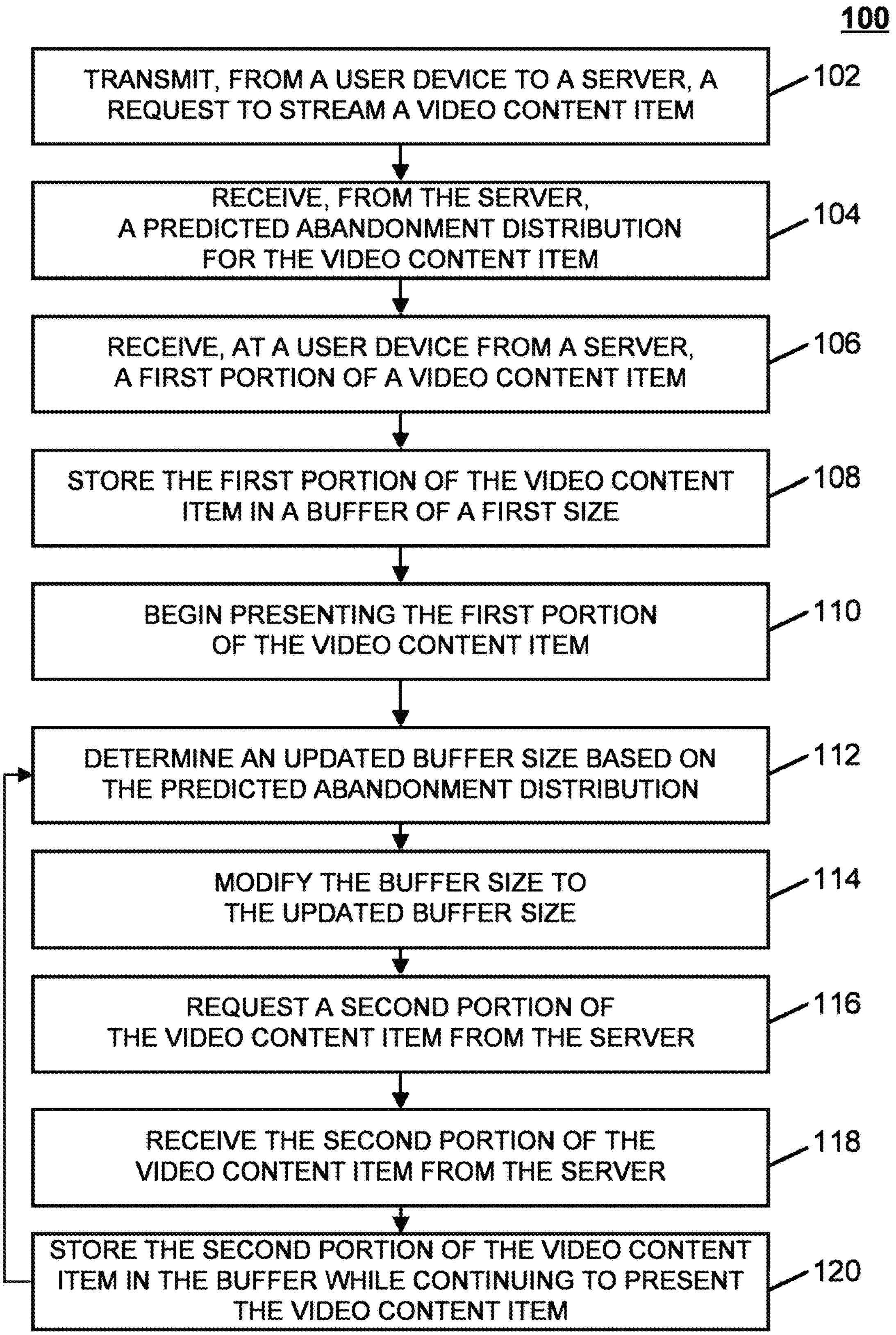
FIG. 1 shows an illustrative example of a process for streaming video content using adaptive buffers in accordance with some embodiments of the disclosed subject matter.

In accordance with various embodiments, mechanisms (which can include methods, systems, and media) for streaming video content using adaptive buffers are provided.

In some embodiments, the mechanisms described herein can modify a size of a buffer used to store media content that is being streamed based on a likelihood that a user viewing the media content will stop presentation of the media content prior to an end of the media content (which is sometimes referred to as video playback abandonment).

In some embodiments, a server that streams a media content item to a user device can transmit a predicted abandonment distribution to the user device that indicates a likelihood that a user of the user device will stop presentation of the media content item at different playback time points within the media content item. In some embodiments, the user device can receive the predicted abandonment distribution and can modify a size of a buffer used by the user device to store portions of the media content item received from the server prior to presentation of the portions of the media content item by the user device. In some embodiments, the user device can modify a size of a buffer in any suitable manner. For example, in some embodiments, a user device can initially store portions of a streamed media content item in a buffer of a first size, and, in response to receiving a predicted abandonment distribution that indicates that a user of the user device is relatively likely to stop presentation of the media content item, can decrease a size of the buffer such that less of the media content item is requested from the server and stored by the user device. Conversely, in response to receiving a predicted abandonment distribution that indicates that a user of the user device is not relatively likely to stop presentation of the media content item, the user device can increase a size of the buffer such that more of the media content item is requested from the server and stored by the user device.

In some embodiments, the mechanisms described herein can determine a predicted abandonment distribution in any suitable manner and based on any suitable information. For example, in some embodiments, a server that streams media content to user devices can determine, for a particular media content item, a predicted abandonment distribution that indicates likelihoods that a user viewing the media content item will stop presentation of the media content item at different presentation time points of the media content item. In some embodiments, a predicted abandonment distribution for a particular media content item can be determined based on any suitable information associated with the media content item, such as a duration of the media content item, whether the media content item includes music, whether the media content item is inserted inline in a website (e.g., in a listing of media content items) or a social networking post, whether the media content item is configured to auto-play, whether audio content associated with the media content item is muted by default, and/or any other suitable information. In some embodiments, a predicted abandonment distribution for a particular media content item can be determined based on previous viewings of the media content item by other users, such as a percentage of users that watched the media content item in its entirety, an average duration of the media content item viewed by users prior to stopping presentation of the media content item, and/or any other suitable previous viewing information.

Note that, although the mechanisms described herein are generally described as relating to video content, in some embodiments, the mechanisms described herein can be used in connection with streaming any suitable type of media content, such as audio content (e.g., music, podcasts, live-streamed audio content, and/or any other suitable type of audio content), video content (e.g., videos, television shows, movies, live-streamed video content, games, and/or any other suitable type of video content), and/or any other suitable type of media content).

Turning to FIG. 1, an illustrative example 100 of a process for streaming video content using adaptive buffers is shown in accordance with some embodiments of the disclosed subject matter. In some embodiments, blocks of process 100 can be executed on any suitable user device, such as a mobile phone, a tablet computer, a laptop computer, a desktop computer, a smart television, a media player, a streaming media device connected to a display device, a game console, and/or any other suitable type of user device.

Process 100 can begin at 102 by transmitting, from a user device to a server, a request to stream a video content item. In some embodiments, the video content item can correspond to any suitable type of video content, such as a user-generated video, a music video, a television show, a movie, a live-streamed video, and/or any other suitable type of video content. In some embodiments, process 100 can transmit the request to stream the video content item in response to any suitable information. For example, in some embodiments, process 100 can transmit the request to stream the video content item in response to receiving, at the user device, a user input that indicates a selection of the video content item. As another example, in some embodiments, process 100 can transmit the request to stream the video content item in response to determining that a page (e.g., a browser window, a feed of a social networking service, and/or any other suitable page) has been scrolled to include a portion in which the video content item has been embedded. Note that, in some embodiments, the request to stream the video content item can be transmitted from the user device via any suitable application executing on the user device. In some such embodiments, the application can be associated with any suitable entity or service, such as a media content sharing service that hosts and/or streams the requested video content item, a social networking service, and/or any other suitable entity or service.

In some embodiments, the request to stream the video content item can include any suitable information, such as an identifier of the video content item, information related to the user device executing process 100 (e.g., a model of the user device, an identifier of the user device, a screen size or resolution of a display of the user device, a current orientation of the user device and/or of a display associated with the user device, buffer capacity information, and/or any other suitable device information), information relating to a network connection of the user device (e.g., a current bandwidth of the network connection, a current latency of the network connection, a current signal strength associated with the network connection, and/or any other suitable network information), and/or any other suitable information), and/or any other suitable information.

At 104, process 100 can receive, from the server, a predicted abandonment distribution corresponding to the video content item. In some embodiments, the predicted abandonment distribution can indicate any suitable information. For example, in some embodiments, the predicted abandonment distribution can indicate a probability or a likelihood that the user viewing the video content item will stop presentation of the video content item at different time points of the video content item. In some embodiments, the predicted abandonment distribution can be normalized to a length of the video content item, such that the predicted abandonment distribution indicates predicted abandonment probabilities from [0, 1], where 0 indicates an initial time point of the video content item and where 1 indicates the full duration of the video content item. An example of a predicted abandonment distribution can be: {(0.25, 40); (0.5, 80); (1, 90)}, indicating a 40% likelihood the user will stop presentation of the video content item at 0.25 of the video content item duration, an 80% likelihood that the user will stop presentation of the video content item at 0.5 of the video content item duration, and a 90% likelihood that the user will stop presentation of the video content item at the full length of the video content item duration. In some embodiments, the predicted abandonment distribution can indicate probabilities for any suitable number of time points of the video content item. For example, in some embodiments, the predicted abandonment distribution can indicate probabilities along a continuous time distribution. As another example, in some embodiments, the predicted abandonment distribution can indicate probabilities at any suitable predetermined intervals of the full duration of the video content item (e.g., at intervals of 0.1 of the video content item duration, at intervals at 0.01 of the video content item duration, and/or at any other suitable intervals). As yet another example, in some embodiments, the predicted abandonment distribution can indicate probabilities at any suitable predetermined time points of the video content item (e.g., every second, every ten seconds, every minute, and/or at any other suitable time points).

In some embodiments, the predicted abandonment distribution can allow the user device to calculate a probability that a user of the user device will stop presentation of the video content item between a current time $t_0$ and a future time t, such as:

$$P(T \leq t_0 + t \mid T > t_0).$$

In some embodiments, this probability can be represented as:

$$P(T \leq t_0 + t \mid T > t_0) = \frac{P(t_0 < T \leq t_0 + t)}{P(T > t_0)} = \frac{F(t_0 + t) - F(t_0)}{S(t_0)},$$

where F indicates an abandonment distribution calculated by the server, and where S indicates a probability that the user will watch the video content item at least until time t0. Note that, in some embodiments, $S(t_0)=1-F(t_0)$. More detailed techniques for calculating the abandonment distribution F are described below in connection with 202 of FIG. 2.

Note that, in some embodiments, the predicted abandonment distribution can be determined by the server in any suitable manner and based on any suitable information, such as shown in and described below in connection with FIG. 2.

At 106, the user device can receive, from the server, a first portion of the video content item. In some embodiments, the first portion of the video content item can correspond to any suitable portion of the video content item, and can be of any suitable size (e.g., a particular number of kilobytes of data, and/or any other suitable size) and/or duration (e.g., one second, two seconds, five seconds, and/or any other suitable duration).

At 108, process 100 can store the first portion of the video content item in a buffer of the user device that has a first size. In some embodiments, the first size of the buffer can be set based on any suitable information. For example, in some embodiments, the first size of the buffer can be a default value (e.g., a default value set by the user device, a default value set by an application for streaming media content that is executing on the user device, and/or any other suitable default value). In some embodiments, the first size of the buffer can correspond to any suitable size (e.g., a predetermined number of frames of media content, a predetermined size of the first portion of the video content item, and/or any other suitable size) and/or any suitable duration of video content (e.g., two seconds, five seconds, ten seconds, and/or any other suitable duration).

At 110, process 100 can begin presenting the first portion of the video content item. In some embodiments, process 100 can begin presenting the first portion of the video content item in any suitable manner. For example, in some embodiments, process 100 can cause the first portion of the video content item to be retrieved from the buffer prior to presenting the first portion of the video content item. As another example, in some embodiments, process 100 can cause the first portion of the video content item to be presented within a video player window presented on the user device executing process 100. In some such embodiments, the video player window can be presented within any suitable user interface, such as within a user interface presented within an application for streaming media content from a particular media content sharing service, a user interface presented within a browser window, and/or any other suitable user interface.

At 112, process 100 can determine an updated buffer size based on the predicted abandonment distribution. In some embodiments, process 100 can determine the updated buffer size in any suitable manner. For example, in some embodiments, process 100 can determine the updated buffer size such that the updated buffer size is smaller than the first size of the buffer in response to determining that a predicted abandonment likelihood exceeds a predetermined threshold (e.g., greater than a 50% likelihood the user will stop presentation of the video content item, greater than a 70% likelihood the user will stop presentation of the video content item, and/or any other suitable likelihood). As another example, in some embodiments, process 100 can determine the updated buffer size such that the updated buffer size is larger than the first size of the buffer in response to determining that a predicted abandonment likelihood is below a predetermined threshold (e.g., less than a 10% likelihood that the user will stop presentation of the video content item, less than a 20% likelihood that the user will stop presentation of the video content item, and/or any other suitable likelihood). Note that, in some embodiments, any suitable predetermined threshold can be used to determine if a buffer size is to be increased or decreased.

Note that, in some embodiments, process 100 can determine the updated buffer size based on a predicted abandonment likelihood within a particular time range. For example, in some embodiments, process 100 can determine the updated buffer size based on a predicted abandonment likelihood within a predetermined duration of time from a current presentation time point of the video content item (e.g., within the next minute, within the next five minutes, and/or any other suitable duration of time). As a more particular example, using the abandonment probability distribution given above of $P(T \leq t_0+t \mid T>t_0)$, where $t_0$ indicates a current time, process 100 can determine a probability that a user of the user device will stop presentation of the video content item between the current time $t_0$ and a future time t, where t is any suitable predetermined duration of time in the future (e.g., five seconds, ten seconds, one minute, three minutes, five minutes, and/or any other suitable duration of time). Note that, in some embodiments, the future time t can be determined based on a current buffer size (e.g., the first buffer size, as described above in connection with 108). For example, in an instance in which a current buffer size corresponds to a particular duration of the video content item (e.g., five seconds, ten seconds, and/or any other suitable duration of time), the future time t can correspond to the duration of the video content item associated with the current buffer size. Additionally or alternatively, note that, in some embodiments, the future time t can be determined based on a total duration of the video content item.

In some embodiments, process 100 can determine the updated buffer size based on the predicted abandonment distribution using any suitable technique or combination of techniques. For example, in some embodiments, process 100 can modify a size of the buffer from the first size by increasing or decreasing the buffer size by a fixed amount. As another example, in some embodiments, process 100 can determine a change to the buffer size based on the likelihood a user of the user device will stop presentation of the video content item as calculated using the predicted abandonment distribution. As a more particular example, in an instance in which process 100 determines that the buffer size is to be increased based on a determination that the likelihood the user will stop presentation of the video content item is below a predetermined threshold, process 100 can determine the size of the buffer size increase based on an amount by which the likelihood is below the predetermined threshold. As a specific example, in an instance in which process 100 calculates the likelihood that the user will stop presentation of the video content item as 40% and in which the predetermined threshold is 60%, process 100 can determine that the buffer size is to be increased by a first amount (e.g., to hold an additional three seconds of video content item, to hold an additional five seconds of video content item, and/or any other suitable amount). Continuing with this specific example, in an instance in which process 100 calculates the likelihood that the user will stop presentation of the video content item as 10% and in which the predetermined threshold is 60%, process 100 can determine that the buffer size is to be increased by a second amount that is larger than the first amount. Note that, in some embodiments, process 100 can determine updated buffer sizes that are smaller than the first buffer size using similar techniques, for example, in response to determining that the likelihood that the user will stop presentation of the video content item exceeds a predetermined threshold.

At 114, process 100 can modify the buffer size from the first size to the updated buffer size. In some embodiments, process 100 can modify the buffer size in any suitable manner. For example, in some embodiments, process 100 can transmit a function call to any suitable function that allocates a buffer for media content. In some such embodiments, process 100 can transmit the updated buffer size as a parameter, for example, to a buffer controller.

At 116, process 100 can request a second portion of the video content item from the server. In some embodiments, process 100 can request the second portion of the video content item based on any suitable information. For example, in some embodiments, process 100 can request the second portion of the video content item in response to a determination that an amount of video content stored in the buffer has dropped below a predetermined threshold (e.g., that less than a predetermined duration of the video content item remains in the buffer, and/or any other suitable amount of the video content item). As another example, in some embodiments, process 100 can request the second portion of the video content item in response to a determination that more than a predetermined amount of the first portion of the video content item has been presented. Note that, in some embodiments, process 100 can transmit an indication of the updated buffer size to the server.

Note that, in some embodiments, process 100 can request the second portion of the video content item from the server based on determining whether a time delay between requests for portions of the video content item has elapsed since a previous request for a portion of the video content item (e.g., since a request to stream the video content item transmitted at 102, and/or any other suitable previously transmitted request). In some embodiments, the time delay can be determined based on the predicted abandonment distribution. For example, given the example predicted probability that a user will stop presentation of the video content item between t and $t_0$ given above of:

$$P(T \leq t_0 + t \mid T > t_0) = \frac{F(t_0 + t) - F(t_0)}{1 - F(t_0)},$$

the probability can be represented as:

$$P = \frac{F(t_0 + t) - F(x)}{1 - F(x)}.$$

In some embodiments, x can represent a media location the user device executing process 100 is to reach before the abandonment probability drops to a threshold P. In some embodiments, the abandonment distribution can be represented as:

$$F(x) = \frac{F(t_0 + t) - P}{1 - P}.$$

In some embodiments:

$$x = F^{-1}\left(\frac{F(t_0 + t) - P}{1 - P}\right).$$

In some embodiments, time can be calculated as:

$$x = cdf^{-1}\left(\frac{cdf(t_0 + t) - P}{1 - P}\right),$$

and the time delay can be calculated as:

$$\text{delay} = \text{quantile}\left(\frac{cdf(t_0 + t) - P}{1 - P}\right) - t_0.$$

At 118, process 100 can receive the second portion of the video content item from the server in response to the request. In some embodiments, the second portion of the video content item can be of any suitable size or duration. Note that, in some embodiments, the second portion of the video content item can have a size or a duration that is different than a size or duration of the first portion of the video content item as described above in connection with 106. For example, in some embodiments, the second portion of the video content item can have a size or a duration that corresponds to the updated buffer size. As a more particular example, in some embodiments, in an instance in which process 100 modified the buffer size (e.g., as described above in connection with 114) to have a relatively smaller buffer size than the first size of the buffer, the second portion of the video content item can have a smaller size or a shorter duration than the first portion of the video content item. As another more particular example, in some embodiments, in an instance in which process 100 modified the buffer size (e.g., as described above in connection with 114) to have a relatively larger buffer size than the first size of the buffer, the second portion of the video content item can have a larger size or a longer duration than the first portion of the video content item.

At 120, process 100 can store the second portion of the video content item in the buffer while continuing to present the video content item. In some embodiments, process 100 can continue to present the video content item in any suitable manner. For example, in some embodiments, process 100 can continue retrieving portions of the video content item from the buffer and presenting the retrieved portions of the video content item in a video player window, such as described above in connection with 106.

In some embodiments, process 100 can loop back to 112 and can determine an updated buffer size (that is, can determine a third size for the buffer of the user device) based on the predicted abandonment distribution, and can modify the buffer size to the updated (third) buffer size at 114 while continuing presentation of the content item. Note that, in some embodiments, process 100 can cause the size of the buffer to change to, in sequence, multiple times during presentation of the video content item based on the predicted abandonment distribution. In some such embodiments, process 100 can cause the size of the buffer to change any suitable number of times (e.g., once, twice, three times, ten times, and/or any other suitable number of times) during presentation of the video content item. As a specific example, in an instance in which the predicted abandonment distribution indicates that the user is relatively likely to stop presentation of the video content item at the beginning of the video content item, process 100 can cause the buffer to have a correspondingly small size during presentation of the beginning portion of the video content item. Continuing with this example, in an instance in which the user did not stop presentation of the video content item during a beginning portion of the video content item and in which the predicted abandonment distribution indicates that the user is unlikely to stop presentation of the video content item during a middle portion of the video content item, process 100 can cause the buffer size to increase during presentation of the middle portion of the video content item. Continuing further with this example, in an instance in which the user did not stop presentation of the video content item during the middle portion of the video content item, and in which the predicted abandonment distribution indicates that the user is likely to stop presentation of the video content item during an end portion of the video content item prior to the full duration of the video content item, process 100 can cause the buffer size to decrease during presentation of the end portion of the video content item.

Figure 2:
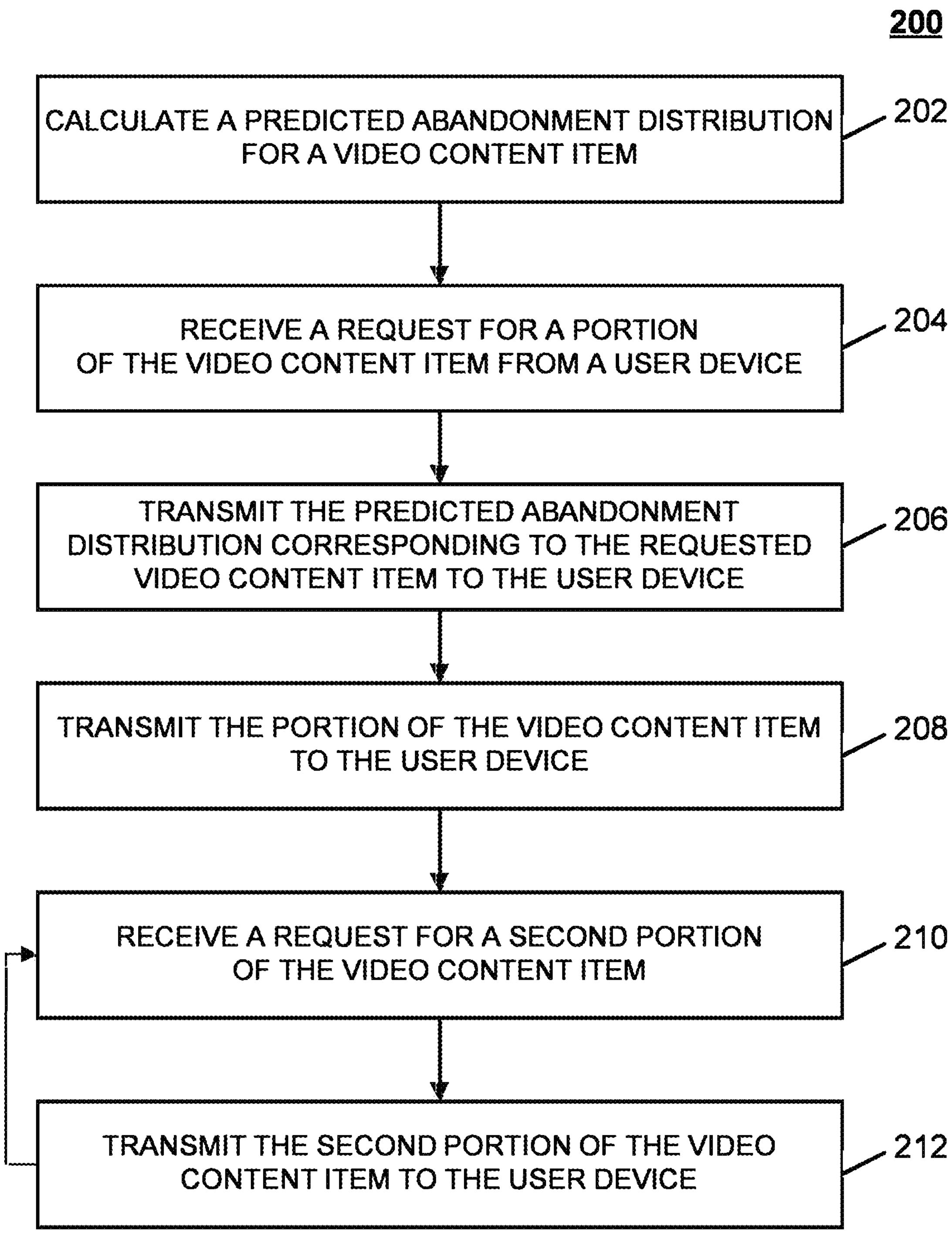
FIG. 2 shows an illustrative example of a process for generating a predicted abandonment distribution in accordance with some embodiments of the disclosed subject matter.

Turning to FIG. 2, an illustrative example 200 of a process for determining a predicted abandonment distribution is shown in accordance with some embodiments of the disclosed subject matter. In some embodiments, blocks of process 200 can be executed by a server, such as a server that hosts and/or streams media content to user devices. Note that, in some embodiments, the server can be associated with a particular media content sharing service that hosts any suitable media content (e.g., user-generated media content, videos, television shows, movies, music, and/or any other suitable type of media content) and streams the media content to user devices.

Process 200 can begin by calculating a predicted abandonment distribution for a video content item at 202. As described above in connection with 104 of FIG. 1, in some embodiments, the predicted abandonment distribution can indicate any suitable information. For example, in some embodiments, the predicted abandonment distribution can indicate a probability or a likelihood that the user viewing the video content item will stop presentation of the video content item at different time points of the video content item. In some embodiments, the predicted abandonment distribution can be normalized to a length of the video content item, such that the predicted abandonment distribution indicates predicted abandonment probabilities from [0, 1], where 0 indicates an initial time point of the video content item and where 1 indicates the full duration of the video content item. As described above in connection with 104 of FIG. 1, an example of a predicted abandonment distribution can include values of: {(0.25, 40); (0.5, 80); (1, 100)}, indicating a 40% likelihood the user will stop presentation of the video content item at 0.25 of the video content item duration, an 80% likelihood that the user will stop presentation of the video content item at 0.5 of the video content item duration, and a 100% likelihood that the user will stop presentation of the video content item at the full length of the video content item duration. Note that, in some embodiments, the predicted abandonment distribution can be a full-continuous distribution such that a predicted abandonment probability can be calculated at any time point. Alternatively, in some embodiments, the predicted abandonment distribution can indicate probabilities for any suitable number of time points of the video content item. For example, in some embodiments, the predicted abandonment distribution can indicate probabilities at any suitable predetermined intervals of the full duration of the video content item (e.g., at intervals of 0.1 of the video content item duration, at intervals at 0.01 of the video content item duration, and/or at any other suitable intervals). As another example, in some embodiments, the predicted abandonment distribution can indicate probabilities at any suitable predetermined time points of the video content item (e.g., every second, every ten seconds, every minute, and/or at any other suitable time points).

In some embodiments, process 200 can calculate the predicted abandonment distribution in any suitable manner and using any suitable technique(s). For example, in some embodiments, process 200 can model any suitable distribution that indicates, at different points along the distribution, a likelihood or probability that a user will stop presentation of the video content item. In some embodiments, process 200 can generate the model using data related to previously viewed video content items by any suitable group of users. Note that, in some embodiments, process 200 can generate the model using a dataset of any suitable size (e.g., thousands of previously viewed video content items, millions of previously viewed video content items, and/or any other suitable size). Additionally, note that, in some embodiments, process 200 can pre-process data used to generate the model in any suitable manner, prior to generating the model. For example, in some embodiments, process 200 can discard any suitable outliers, such as video content items that were watched for a duration of zero time (indicating that the video content item was accidentally selected), and/or any other suitable outliers. In some embodiments, the duration of the video content item can be normalized such that the distribution of the range spans [0, 1]. In some embodiments, any suitable distribution can be used, such as a Kumaraswamy distribution, a Beta distribution, a logit-transformed distribution, and/or any other suitable distribution.

In some embodiments, process 200 can model the distribution using any suitable technique or combination of techniques. For example, in some embodiments, the distribution can be modeled as a one-inflated mixture of regressions. As a more particular example, in some embodiments, the distribution can be modeled as a mixture or combination of two or more regressions, such as a first regression that models a likelihood of a user watching an entirety of the video content item and a second regression that models a likelihood of a user stopping presentation of the video content item at different time points. In some embodiments, each regression included in the mixture of regressions can be a different type of regression (e.g., a Kumaraswamy regression, a Beta regression, a logistic regression, and/or any other suitable type of regression). For example, in some embodiments, a first regression that models a likelihood of a user watching an entirety of the video content item can be a logistic regression, and a second regression that models a likelihood of a user stopping presentation of the video content item at different time points can be a Kumaraswamy regression. Note that, in some embodiments, a first regression that models a likelihood of a user watching an entirety of the video content item can be any suitable type of classifier, such as a gradient boosted trees classifier, and/or any other suitable type of classifier. Additionally, note that, in some embodiments, each regression in the mixture of regressions can have any suitable number of terms corresponding to any suitable components or predictors, and can have any suitable number of cross-terms. For example, in some embodiments, both the first regression and the second regression of the mixture of regressions can include the same predictors and the same cross terms. As another example, in some embodiments, the second regression can be a Kumaraswamy regression that includes any suitable quadratic terms.

Note that, in some embodiments, in instances in which process 200 generates a mixture of regressions in which a first regression models a likelihood of a user watching an entirety of the video content item, process 200 can determine, during the generation of a training set of data, whether video content items included in the training set were watched in their entirety in any suitable manner. For example, in some embodiments, process 200 can determine (e.g., using log data associated with a playback of each video content item) whether a state of a video player used for presentation of the video content item changed in any suitable manner that indicates that the video content item was presented by the video played in its entirety.

Additionally, note that, in some embodiments, rather than generating a mixture of regressions such as described above, in some embodiments, process 200 can process the data used to generate the model to contract data points to any suitable middle value, such as 0.5, such that there are no zero or one values included in the data. In some embodiments, process 200 can transform the data points to contract the data points using any suitable contraction function.

In some embodiments, each regression can be based on a different set of predictors that are used to generate the regression. In some embodiments, the set of predictors can include any suitable factors or variables. For example, in some embodiments, the set of predictors can include characteristics of the video content item, such as a duration of the video content item, a logarithm of the duration of the video content item, whether the video content item includes background music, whether the video content item is an advertisement, whether the video content item is an advertisement that is skippable, and/or any other suitable characteristics of the video content item. As another example, in some embodiments, the set of predictors can include characteristics related to a manner in which the video content item is linked or embedded within other content (e.g., within a webpage, within a social networking post, within a message, and/or in any other suitable type of content), such as a type of interface in which the video content item is linked or embedded (e.g., whether the video content item is embedded inline in a website or social networking post), whether the video content item has been set to auto-play by default, whether the video content item has been set to mute by default, whether the video content item has been set to have muted audio content when embedded inline, and/or any suitable characteristics. As yet another example, in some embodiments, the set of predictors can include information indicating buffering of the video content item, such as a likelihood the user will stop presentation of the video content item if the video content item is paused to re-buffer, a predicted duration of time required to re-buffer the video content item, a predicted number of times the video content item will be re-buffered, and/or any other suitable buffering information. As still another example, in some embodiments, the set of predictors can include information related to a manner in which the video content item was previously viewed by other users, such as an average duration of time previous users viewed the video content item, a proportion of users that fully viewed the video content item, a proportion of users that stopped presentation of the video content item prior to a particular presentation time point (e.g., prior to a halfway point of the video content item, prior to a particular presentation timestamp, and/or any other suitable time point), and/or any other suitable previous viewing information. As a further example, in some embodiments, the set of predictors can include seek information related to a manner in which the video content item is currently being viewed or was previously viewed, where a seek instruction during the playback of a video can be considered a playback abandonment.

In some embodiments, process 200 can fit regressions in the mixture of regressions using any suitable technique or combination of techniques. For example, in some embodiments, process 200 can use expectation-maximization to generate coefficients for each predictor associated with each regression. As a more particular example, in some embodiments, a Kumaraswamy regression used in the mixture of regressions can have distribution parameters that depend on any suitable predictor variables (such as described above) via a relationship such as: $\log(a)=P*X$ and $\log(b)=Q*X$, where P and Q are coefficient matrices, and X is a covariate vector. In some embodiments, process 200 can estimate model parameters (e.g., coefficient matrices P and Q) using maximum likelihood estimation using any suitable technique or combination of techniques (e.g., the Newton-Raphson method, and/or any other suitable technique(s)). As another example, in some embodiments, in an instance in which a logistic regression is used to model a first regression that indicates a likelihood that a user will watch an entirety of the video content item, coefficients associated with any suitable predictors of the logistic regression can be calculated using any suitable technique or combination of techniques.

At 204, process 200 can receive a request for a portion of the video content item from a user device. In some embodiments, process 200 can receive the request for the portion of the video content item in any suitable manner. For example, in some embodiments, process 200 can receive an indication that a user of the user device has selected a particular video content item for presentation on the user device. As another example, in some embodiments, process 200 can receive an indication that a page in which the video content item embedded has been navigated such that the video content item is visible.

Note that, in some embodiments, process 200 can receive, from the user device, any suitable information related to the user device (e.g., a model of the user device, an identifier of the user device, a screen size or resolution of a display associated with the user device, a current orientation of the user device and/or display associated with the user device, and/or any other suitable information) and/or any suitable information related to a connection of the user device to a communication network used to receive streamed media content (e.g., a current bandwidth of the connection, a current latency of the connection, a current signal strength of the connection, an identifier of a type of connection, and/or any other suitable information).

At 206, process 200 can transmit the predicted abandonment distribution corresponding to the requested video content item to the user device. In some embodiments, process 200 can transmit the predicted abandonment distribution in any suitable manner. For example, in an instance in which the predicted abandonment distribution is a continue distribution, process 200 can transmit parameters of the continuous distribution to the user device. As another example, in some embodiments, process 200 can format the predicted abandonment distribution as an array, where a first set of elements of the array indicate different time points of the video content item normalized from 0 to 1, and where the second set of elements of the array indicate likelihoods that a user viewing the video content item will stop presentation of the video content item at each of the corresponding time points. In some such embodiments, process 200 can transmit the array to the user device.

At 208, process 200 can transmit the portion of the video content item to the user device. Note that, in some embodiments, process 200 can identify a file corresponding to the portion of the video content item prior to transmitting the portion of the video content item to the user device. For example, in some embodiments, process 200 can identify a file corresponding to a version of the portion of the video content item that is identified based on information associated with the user device and/or information associated with the connection of the user device to a communication network. As a more particular example, in some embodiments, process 200 can identify a version of the video content item associated with a particular resolution based on a screen size of the display associated with the user device. As another more particular example, in some embodiments, process 200 can identify a version of the video content item associated with a particular resolution based on a current bandwidth of the network connection.

At 210, process 200 can optionally receive a request for a second portion of the video content item from the user device. In some embodiments, the request for the second portion of the video content item can include any suitable information. For example, in some embodiments, the request for the second portion of the video content item can include an updated buffer size used by the user device, such as described above in connection with 112-116 of FIG. 1. As another example, in some embodiments, the request for the second portion of the video content item can include any suitable network information related to a network connection used by the user device (e.g., a current bandwidth associated with the connection, a current latency associated with the connection, a current signal strength associated with the connection, and/or any other suitable network information). As yet another example, in some embodiments, the request for the second portion of the video content item can include device information related to the user device (e.g., a current buffer capacity of the user device, a current buffer size of the buffer used by the user device, a current display orientation of a display associated with the user device, and/or any other suitable information).

At 212, process 200 can transmit the second portion of the video content item to the user device in response to receiving the request. In some embodiments, process 200 can identify a file associated with the second portion of the video content item prior to transmitting video data included in the file. For example, in some embodiments, process 200 can identify a file corresponding to a particular resolution of video content based on any suitable information, such as based on current network information associated with the network connection of the user device, based on a resolution or size of the display associated with the user device, and/or based on any other suitable information. Note that, in some embodiments, the second portion of the video content item can have any suitable size or duration. For example, in some embodiments, the second portion of the video content item can have a size and/or a duration corresponding to an updated buffer size used by the user device. As a more particular example, in some embodiments, in an instance in which the request for the second portion of the video content item indicates that the user device has modified a size of the buffer to be smaller than a size of the buffer used to store the first portion of the video content item (e.g., as transmitted at 208), process 200 can transmit the second portion of the video content item that is smaller in size and/or has a shorter duration than the first portion of the video content item. Conversely, in an instance in which the request for the second portion of the video content item indicates that the user device has modified a size of the buffer to be larger than a size of the buffer used the store the first portion of the video content item, process 200 can transmit the second portion of the video content item that is larger in size and/or has a longer duration than the first portion of the video content item.

Note that, in some embodiments, process 200 can transmit more than the portion of the video content item that is requested by the user device in an instance in which the video content item is an advertisement. For example, in some embodiments, in an instance in which the request for the second portion of the video content item indicates that the second portion is to be relatively small in size and/or short in duration (e.g., in response to a determination that a user of the user device is likely to stop presentation of the video content item), process 200 can transmit more than the requested amount or duration of the video content item in response to determining that the video content item is an advertisement.

In some embodiments, process 200 can loop back to 210 and can receive another request for another portion of the video content item. In some such embodiments, process 200 can loop through 210 and 212 until the entire video content item has been streamed to the user device or process 200 receives an indication that a user of the user device has stopped presentation of the video content item.

Note that, although processes 100 and 200 are generally described as the user device receiving a predicted abandonment distribution, determining a buffer size based on the predicted abandonment distribution, and modifying a buffer size based on the determined buffer size, in some embodiments, the server can determine an updated buffer size based on the predicted abandonment distribution. For example, similar to what is described above in connection with block 112 of FIG. 1, in some embodiments, the server can determine whether a buffer size is to be increased or decreased based on the predicted abandonment distribution. In some embodiments, the server can then transmit an indication of the change in buffer size to the user device. Additionally, in some embodiments, the server can change a size of a portion of the video content item that is transmitted to the user device. For example, in an instance in which a first portion of the video content item transmitted to the user device is of a first size or a first duration, and in which the server determines that the buffer size is to be made smaller (e.g., in response to a determination that the likelihood that the user will stop presentation of the video content item is relatively high), the server can transmit a second portion of the video content item that is of a relatively smaller size or a relatively shorter duration. Conversely, in an instance in which the server determines that the buffer size is to be made larger (e.g., in response to a determination that the likelihood that the user will stop presentation of the video content item is relatively low), the server can transmit a second portion of the video content item that is of a relatively larger size or a relatively longer duration. Additionally or alternatively, in some embodiments, the server can calculate a time delay between when portions of the video content item are to be transmitted, where the time delay corresponds to a duration of the video content item that is being buffered by the user device. In some such embodiments, the server can pause transmitting a subsequent portion of the video content item to the user device until the server has determined that the time delay has elapsed. Note that, in some such embodiments, the time delay used by the server can be modified during streaming of the video content item, based on the predicted abandonment distribution.

Figure 3:
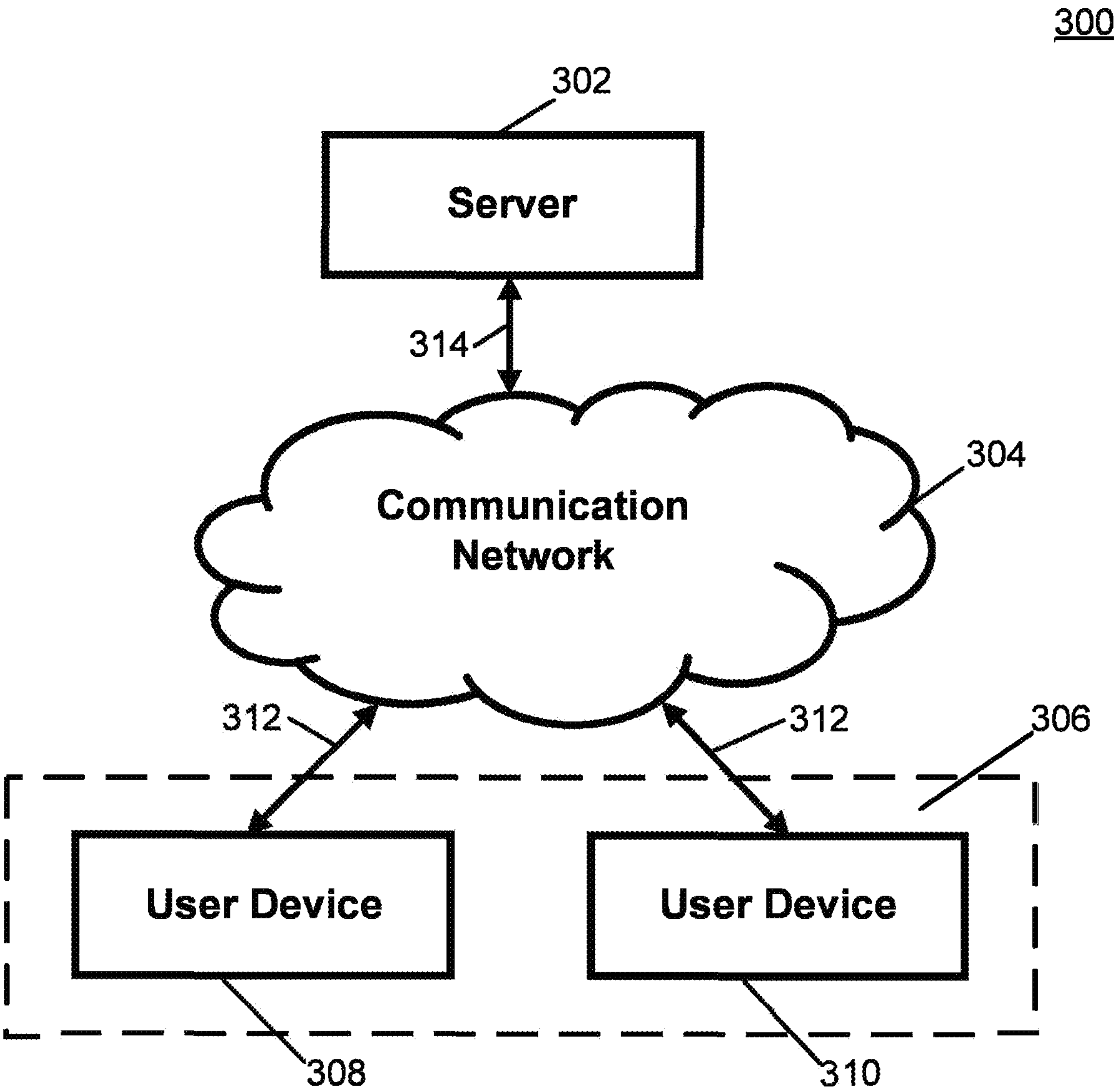
FIG. 3 shows a schematic diagram of an illustrative system suitable for implementation of mechanisms described herein for streaming video content using adaptive buffers in accordance with some embodiments of the disclosed subject matter.

Turning to FIG. 3, an illustrative example 300 of hardware for streaming video content using adaptive buffers that can be used in accordance with some embodiments of the disclosed subject matter is shown. As illustrated, hardware 300 can include a server 302, a communication network 304, and/or one or more user devices 306, such as user devices 308 and 310.

Server 302 can be any suitable server(s) for storing information, data, programs, media content, and/or any other suitable content. In some embodiments, server 302 can perform any suitable function(s). For example, in some embodiments, server 302 can transmit media content (e.g., video content, audio content, and/or any other suitable audio content) to a user device, such as one of user devices 306. As a more particular example, in some embodiments, server 302 can stream media content to a user device in response to a request for the media content. As another example, in some embodiments, server 302 can determine a predicted abandonment distribution that indicates likelihoods that a user of a user device streaming a media content item from server 302 will stop presentation of the media content item at different presentation time points of the media content item, such as shown in and described above in connection with FIG. 2.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices suitable for streaming media content from server 302. In some embodiments, user device 306 can include any suitable type of user device, such as mobile phones, tablet computers, wearable computers, laptop computers, desktop computers, smart televisions, media players, game consoles, vehicle information and/or entertainment systems, and/or any other suitable type of user device. In some embodiments, user devices 306 can adaptively modify a size of a buffer used to store media content received from server 302 during streaming of the media content. For example, in some embodiments, user devices 306 can modify the size of a buffer based on a predicted abandonment distribution received from server 302 that indicates a likelihood user device 306 will continue presenting a media content item, as shown in and described above in connection with FIG. 1.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Figure 4:
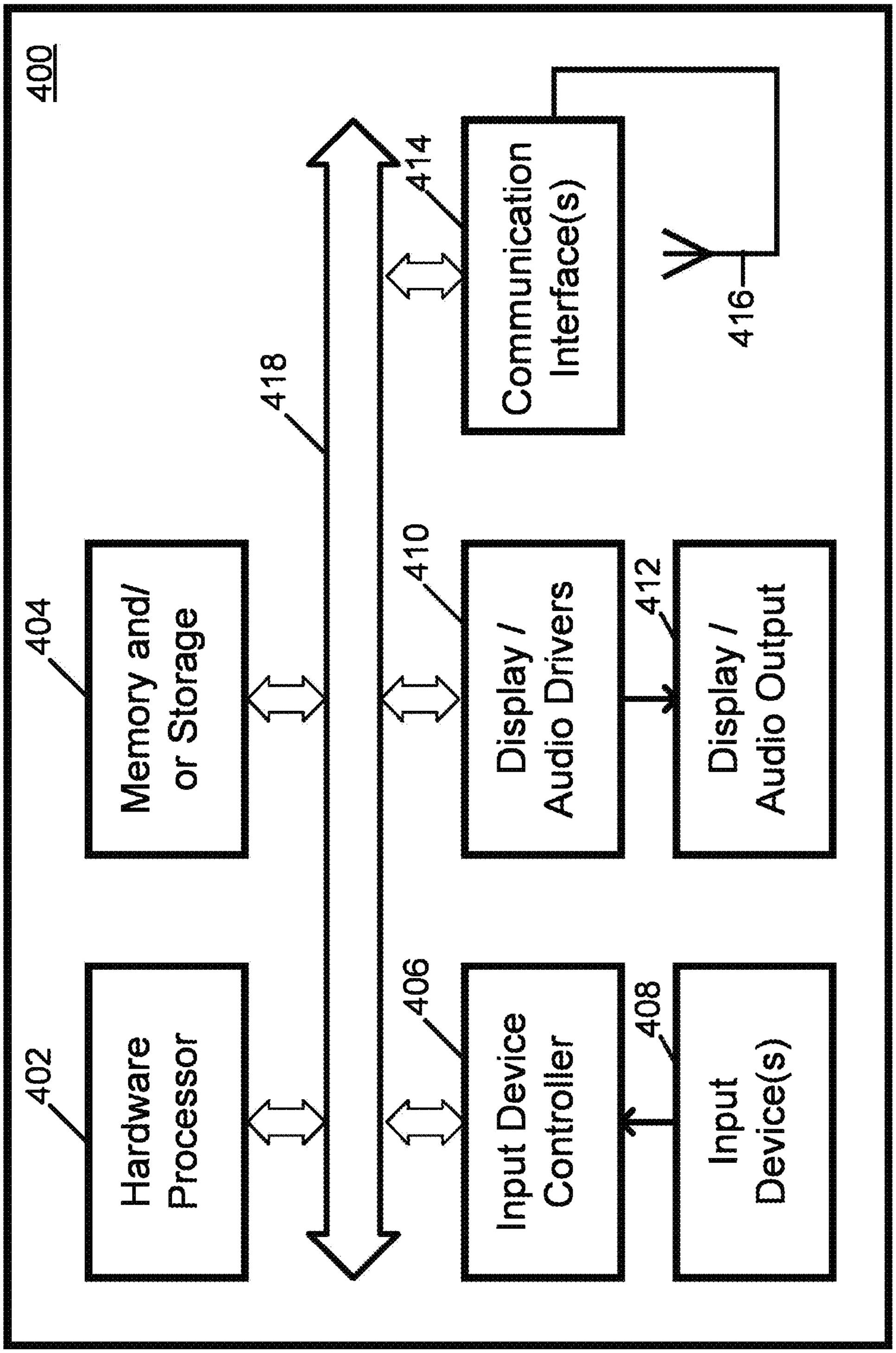
FIG. 4 shows a detailed example of hardware that can be used in a server and/or a user device of FIG. 3 in accordance with some embodiments of the disclosed subject matter.

Server 302 and user devices 306 can be implemented using any suitable hardware in some embodiments. For example, in some embodiments, devices 302 and 306 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a server program stored in memory and/or storage of a server, such as server 302. In some embodiments, hardware processor 402 can be controlled by a computer program stored in memory and/or storage 404 of user device 306.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory. An adaptive buffer may be defined in the memory and/or storage 404, for example, by the hardware processor 402.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for streaming video content using adaptive buffers are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for streaming video content using buffers, the method comprising:

receiving, from a user device at a server device of a media content sharing service, a request to stream a video content item;

determining, at the server device of the media content sharing service, a predicted abandonment distribution for the requested video content item, wherein the predicted abandonment distribution is determined using two or more predictive models comprising a first predictive model configured to estimate a likelihood of a user of the user device watching an entirety of the video content item and a second predictive model configured to estimate a likelihood of the user of the user device stopping presentation of the video content item at different presentation time points before an end of the video content item; and transmitting, by the server device of the media content sharing service to the user device, a portion of the video content item to the user device based on the predicted abandonment distribution.

2. The method of claim 1, wherein a size of the portion of the video content item that is transmitted to the user device is determined based on the predicted abandonment distribution.

3. The method of claim 1, wherein the predicted abandonment distribution is determined using the two or more predictive models and a duration of the video content item as input to at least one of the two or more predictive models.

4. The method of claim 1, wherein the predicted abandonment distribution is determined using the two or more predictive models and characteristics of the video content item as input to at least one of the two or more predictive models.

5. The method of claim 1, further comprising transmitting the predicted abandonment distribution to the user device.

6. The method of claim 1, further comprising:

receiving, from the user device, a request for a second portion of the video content item; and transmitting the second portion of the video content item based on the predicted abandonment distribution, wherein the second portion of the video content item has a different size than the portion of the video content item.

7. The method of claim 1, wherein a size of a buffer of the user device depends on the predicted abandonment distribution.

8. A system for streaming video content using buffers, the system comprising:

a memory; and a hardware processor, coupled to the memory, to perform operations comprising:

receiving, from a user device at a server device of a media content sharing service, a request to stream a video content item;

determining, at the server device of the media content sharing service, a predicted abandonment distribution for the requested video content item, wherein the predicted abandonment distribution is determined using two or more predictive models comprising a first predictive model configured to estimate a likelihood of a user of the user device watching an entirety of the video content item and a second predictive model configured to estimate a likelihood of the user of the user device stopping presentation of the video content item at different presentation time points before an end of the video content item; and transmitting, by the server device of the media content sharing service to the user device, a portion of the video content item to the user device based on the predicted abandonment distribution.

9. The system of claim 8, wherein a size of the portion of the video content item that is transmitted to the user device is determined based on the predicted abandonment distribution.

10. The system of claim 8, wherein the predicted abandonment distribution is determined using the two or more predictive models and a duration of the video content item as input to at least one of the two or more predictive models.

11. The system of claim 8, wherein the predicted abandonment distribution is determined using the two or more predictive models and characteristics of the video content item as input to at least one of the two or more predictive models.

12. The system of claim 8, the operations further comprising transmitting the predicted abandonment distribution to the user device.

13. The system of claim 8, the operations further comprising:

receiving, from the user device, a request for a second portion of the video content item; and transmitting the second portion of the video content item based on the predicted abandonment distribution, wherein the second portion of the video content item has a different size than the portion of the video content item.

14. The system of claim 8, wherein a size of a buffer of the user device depends on the predicted abandonment distribution.

15. A non-transitory computer-readable medium comprising instructions, which when performed by a processor, cause the processor to perform operations comprising:

receiving, from a user device at a server device of a media content sharing service, a request to stream a video content item;

determining, at the server device of the media content sharing service, a predicted abandonment distribution for the requested video content item, wherein the predicted abandonment distribution is determined using two or more predictive models comprising a first predictive model configured to estimate a likelihood of a user of the user device watching an entirety of the video content item and a second predictive model configured to estimate a likelihood of the user of the user device stopping presentation of the video content item at different presentation time points before an end of the video content item; and transmitting, by the server device of the media content sharing service to the user device, a portion of the video content item to the user device based on the predicted abandonment distribution.

16. The non-transitory computer-readable medium of claim 15, wherein a size of the portion of the video content item that is transmitted to the user device is determined based on the predicted abandonment distribution.

17. The non-transitory computer-readable medium of claim 15, wherein the predicted abandonment distribution is determined using the two or more predictive models and a duration of the video content item as input to at least one of the two or more predictive models.

18. The non-transitory computer-readable medium of claim 15, wherein the predicted abandonment distribution is determined using the two or more predictive models and characteristics of the video content item as input to at least one of the two or more predictive models.

19. The non-transitory computer-readable medium of claim 15, the operations further comprising transmitting the predicted abandonment distribution to the user device.

20. The non-transitory computer-readable medium of claim 15, the operations further comprising:

receiving, from the user device, a request for a second portion of the video content item; and transmitting the second portion of the video content item based on the predicted abandonment distribution, wherein the second portion of the video content item has a different size than the portion of the video content item.

* * * * *